(12) United States Patent
St. Clair (10) Patent No.: US 9,940,605 B2
(45) Date of Patent: Apr. 10, 2018

(54) INFERRING WEB PREFERENCES FROM MOBILE

(71) Applicant: Facebook, Inc., Menlo Park, CA (US)

(72) Inventor: Luke St. Clair, Redmond, WA (US)

(73) Assignee: Facebook, Inc., Menlo Park, CA (US)

( * ) Notice: Subject to any disclaimer, the term of this patent is extended or adjusted under 35 U.S.C. 154(b) by 324 days.

(21) Appl. No.: 13/759,862

(22) Filed: Feb. 5, 2013

(65) Prior Publication Data

US 2014/0222979 A1    Aug. 7, 2014

(51) Int. Cl.
*H04L 29/08* (2006.01)
*G06Q 10/10* (2012.01)
*G06Q 50/00* (2012.01)
*G06Q 30/02* (2012.01)
*H04W 4/20* (2018.01)
*G06F 9/445* (2018.01)

(52) U.S. Cl.
CPC ........... *G06Q 10/10* (2013.01); *G06F 9/4451* (2013.01); *G06Q 30/02* (2013.01); *G06Q 50/01* (2013.01); *H04L 67/22* (2013.01); *H04W 4/206* (2013.01)

(58) Field of Classification Search
CPC .... G06Q 10/10; G06Q 20/3224; G06Q 30/02; G06Q 50/01; G06F 17/30; G06F 17/2854; G06F 17/30241; G06F 3/0481; G06F 9/4451; G06F 17/30867; H04L 12/1813; H04L 67/02; H04L 67/22; H04L 67/306; H04M 1/7253; H04W 4/00; H04W 4/206
USPC ...... 704/2; 705/7.29, 14.58, 14.66; 709/203, 709/204, 206, 217; 715/733, 764
See application file for complete search history.

(56) References Cited

U.S. PATENT DOCUMENTS

| 6,193,067 | B1* | 2/2001 | McMahan | 206/560 |
| 6,208,339 | B1* | 3/2001 | Atlas et al. | 715/780 |
| 8,756,050 | B1* | 6/2014 | Harkness | G06F 17/2854 704/1 |
| 2006/0256734 | A1* | 11/2006 | Erhart | H04M 1/7253 370/254 |
| 2009/0186633 | A1 | 7/2009 | Yonker et al. | |
| 2010/0317371 | A1* | 12/2010 | Westerinen et al. | 455/456.6 |
| 2011/0264736 | A1 | 10/2011 | Zuckerberg et al. | |
| 2011/0265011 | A1* | 10/2011 | Taylor et al. | 715/751 |
| 2011/0282860 | A1 | 11/2011 | Baarman | |
| 2012/0004956 | A1 | 1/2012 | Huston et al. | |

(Continued)

FOREIGN PATENT DOCUMENTS

CN    101415155    4/2009
CN    101802787 A    8/2010

OTHER PUBLICATIONS

International Search Report and Written Opinion for International Application PCT/US2014/014643, dated May 30, 2014.

(Continued)

*Primary Examiner* — Nicholas R Taylor
*Assistant Examiner* — Michael Li
(74) *Attorney, Agent, or Firm* — Baker Botts L.L.P.

(57) ABSTRACT

In one embodiment, a server providing an on-line service identifies a change associated with a mobile computing device of a user of the on-line service, the on-line service being accessible to the user through a website hosted by the system; the server also in response to the change and without manual user input from the user, modifies aspects of web pages of the website that are associated with use of the on-line service by the user.

20 Claims, 3 Drawing Sheets

(56) References Cited

U.S. PATENT DOCUMENTS

| | | |
|---|---|---|
| 2012/0102409 A1* | 4/2012 | Fan .................. H04W 4/00 715/738 |
| 2012/0110085 A1 | 5/2012 | Malik |
| 2012/0158792 A1 | 6/2012 | Maclaurin |
| 2012/0166433 A1 | 6/2012 | Tseng |
| 2012/0202428 A1 | 8/2012 | Mirbaha et al. |
| 2012/0226688 A1 | 9/2012 | Reid |
| 2012/0304087 A1* | 11/2012 | Walkin et al. ............. 715/764 |
| 2013/0024368 A1 | 1/2013 | Scammell |
| 2014/0222912 A1* | 8/2014 | St. Clair .................. 709/204 |

OTHER PUBLICATIONS

Extended European Search Report received from the European Patent Office, for European Patent Application No. EP 14748476.0-1972 / 2954389, dated Dec. 21, 2016.

Supplementary European Search Report received from the European Patent Office, for European Patent Application No. EP 14 74 8709, dated Jul. 21, 2016.

Chinese Office Action received from the IP Office of the People's Republic of China, for Chinese Patent Application No. 2014800195309, dated May 27, 2017.

* cited by examiner

INFERRING WEB PREFERENCES FROM MOBILE

TECHNICAL FIELD

This disclosure generally relates to mobile computing devices.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

Particular embodiments describe methods for inferring a user's preferences of web pages of an on-line service website based on the user's activities associated with the user's mobile computing device. In particular embodiments, an on-line service system may identify a change associated with a user's mobile computing device. The on-line service system may, in response to identifying the change associated with the mobile computing device and without manual user input from the user, modify aspects of web pages of the website that are associated with use of the on-line service by the user.

DESCRIPTION OF EXAMPLE EMBODIMENTS

Figure 1:
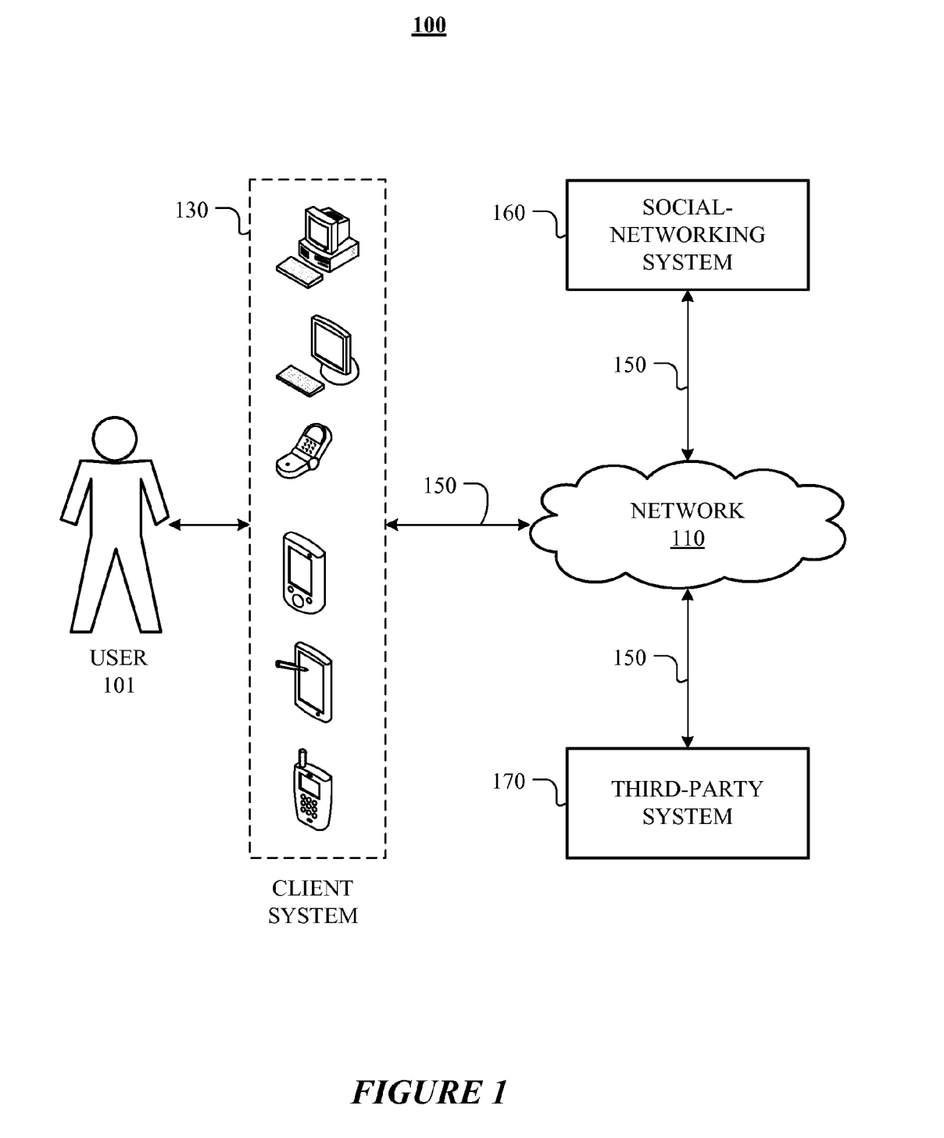
FIG. 1 illustrates an example network environment associated with a social-networking system.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g. an enterprise, business, or third-party application), or a group (e.g. of individuals or entities) that interacts or communicates with or over social-networking system 160. In particular embodiments, social-networking system 160 may be a network-addressable computing system hosting an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server that allows users 101 to opt in or opt out of having their actions logged by social-networking system 160 or shared with other systems (e.g. third-party systems 170), such as, for example, by setting appropriate privacy settings. In particular embodiments, third-party system 170 may be a network-addressable computing system that can host websites or applications. Third-party system 170 may generate, store, receive, and send third-party system data, such as, for example and without limitation, web pages, text, images, video, audio, or applications. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

A user of an online service may access the on-line service through a website hosted by a system providing the on-line service. For example, as web-portal system may provide on-line services such as emails, games, shopping, news, weather forecast, stock quotes, sports scores, and so on. A user of the web-portal system may interact with the web-portal system and with other users of the web-portal system by accessing one or more web pages of a web-portal website hosted by the web-portal system. For another example, a social-networking system may provide on-line social-networking services such as wall posts, photo-sharing, event organization, messaging, games, or advertisements. A user of the social-networking system may interact with the social-networking system and with other users of the social-networking system by accessing one or more web pages of a social-networking website hosted by the social-networking system. Ordinarily, a user's preferences for content, layout, language, or any suitable settings of one or more web pages of a website hosted by an on-line service system may be manually configured by the user and stored in the on-line service system. For example, a user may access a web page of the web site at www.yahoo.com for on-line services provided by Yahoo! Inc. of California (e.g., emails, games, news, weather forecast, and so on). The user may manually configure preferences for the web page (e.g., language, time zone, or layout) and store the preferences in one or more servers of Yahoo! Inc. Particular embodiments describe methods for automatically configuring preferences of web pages of an on-line service website. Particular embodiments may infer preferences of web pages of an on-line service website for a user based on the user's activities associated with the user's mobile computing device.

Figure 2:
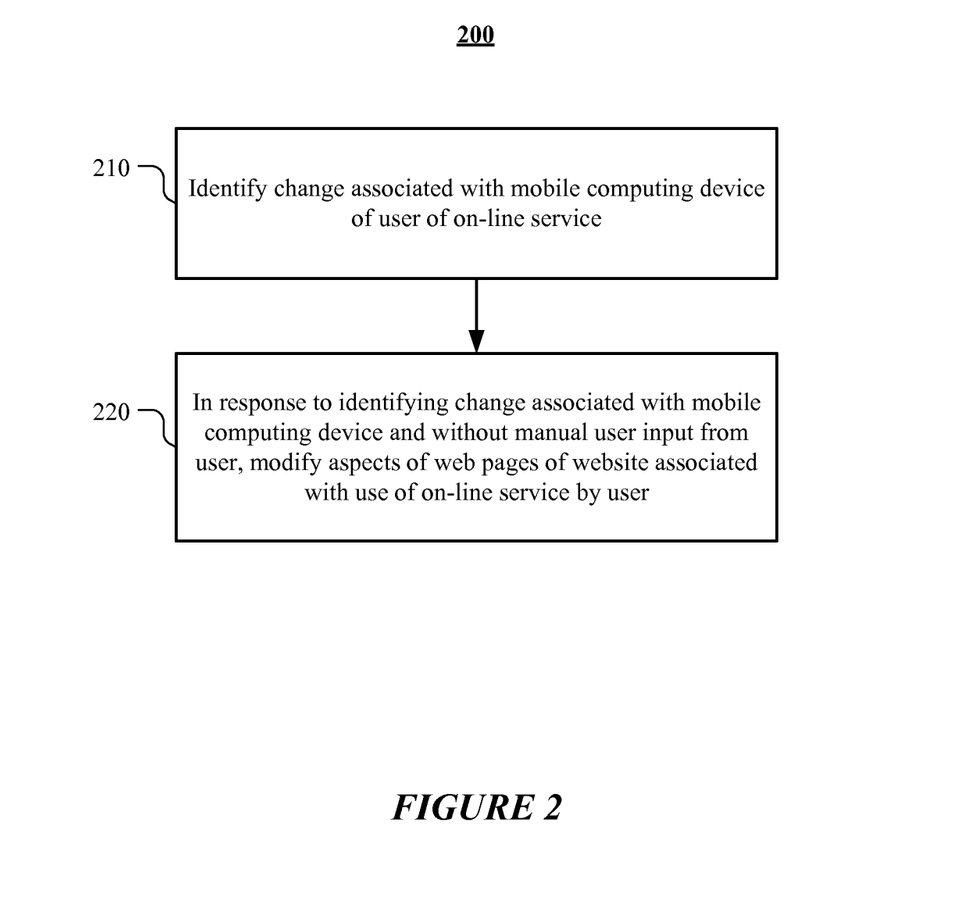
FIG. 2 illustrates an example method for inferring web preferences from mobile devices.

FIG. 2 illustrates an example method 200 for inferring web preferences from mobile devices. The method 200 may be implemented by one or more computing devices (e.g., servers) of a system providing an on-line service. A user of the on-line service may access the on-line service at least through a website hosted by the on-line service system. The method 200 may begin at step 210. In particular embodiments, at step 210, the computing devices of the on-line service may identify a change associated with a mobile computing device of a user of the on-line service.

For example, one or more computing devices of the on-line service system may identify a change in a location of the mobile computing device. For example, the mobile computing device may determine its location based on Global Positioning System (GPS) signals, cellular signal triangulation, locations of wireless access points, or any suitable methods for determining a location for the mobile computing device. The mobile computing device may send its location data to the on-line service system. The computing devices of the on-line service system may identify a location change of the mobile computing device based on location data received from the mobile computing device. The computing devices of the on-line service system may identify a location change of the mobile computing if a received location is different from a previously recorded location of the mobile computing device (e.g., more than one mile apart). The computing device of the on-line service system may also determine a velocity of the mobile computing device (e.g., by calculating changes of recorded locations of the mobile computing device). The computing device of the on-line service system may identify a change in a location of the mobile computing device based on a velocity of the mobile computing device. For example, the computing device of the on-line service system may identify a location change of the mobile computing device if the a velocity of the mobile computing device was greater than 5 kilometers per hour for over one hour and has a current velocity being close to stationary. That is, a person associated with the mobile computing device may have been in motion for at least one hour and now has arrived at the person's destination (i.e., a new location). The computing devices of the on-line service system may also identify a location change of the mobile computing device if the on-line service system receives from the mobile computing device an indication of a new location (e.g., the user checks in to the new location).

In particular embodiments, at step 220, the computing devices of the on-line service system may, in response to identifying the change associated with the mobile computing device and without manual user input from the user, modify one or more aspects of one or more web pages of the websites that are associated with the use of the on-line service by the user. The aspects of the web pages may be one or more content items of the web pages. The aspects of the web pages may be preferences in settings such as language, layout, time zone, or any suitable settings. That is, the computing devices of the on-line service system may, based on a change associated with the user's mobile computing device, automatically modify content or preferences of the web pages accessed by the user for on-line services provided by the on-line service system.

For example, the computing devices of the on-line service system may identify a new location (e.g., Paris) of the mobile computing device as described above. The computing devices may, in response to the new location and without manual user input from the user, provide on the web pages content that is relevant to the new location of the mobile computing device (e.g., images of landmarks in Paris, a selectable icon for a map of public transportation in Paris, an advertisement of a store in Paris). The computing device may also update location information of the user (with the new location) on the web pages (e.g., updating the user's location to the new location on the user's profile page hosted by a social-networking website). In addition, the computing device may identify a change in a language of the mobile computing device based on the change in the location. For example, the computing device may determine that the new location has a language (e.g., French) that is different from a pre-set language (e.g., English) of the mobile computing device (or of the user). The computing device may automatically translate content of the web pages from the pre-set language to the language of the new location (e.g., translating content of the web pages from French to English). The computing device may also automatically provide content associated with the language of the new location, such as a dictionary tool (e.g., a French dictionary tool), a language translation tool (e.g., a French to English translator), or an advertisement related to the language (e.g., an advertisement for a language learning software such as provided by Rosetta Stone in Arlington, Va.).

The computing devices of the on-line service system may also identify a change other than a location change of the mobile computing device, and automatically modify one or more aspects of the web pages of the on-line service website based on the change. For example, the user may change a language setting of the mobile computing device to a new language. Or the user starts using a new language (different from a pre-set language) on the mobile computing device (e.g., composing emails or messages in the new language, changing to the new language in one or more syncing preferences for the mobile computing device). The mobile computing device may send to the on-line service a message indicating the new language for the user. The mobile computing device may send the message to the on-line service by using an application programming interface (API) call. The mobile computing device may send the message to the on-line service with a Hypertext Transfer Protocol (HTTP) POST request. Particular embodiments contemplate any suitable methods for sending a message to the on-line service by the mobile computing device. One or more computing devices of the on-line service system may, in response to the new language and without manual input from the user, modify one or more aspects of one or more web pages of the on-line service website that are accessed by the user. For example, the computing devices may translate content of the web pages to the new language. The computing devices may also provide a dictionary, a translator, or an advertisement related to the new language on the web pages as described earlier.

For another example, the mobile computing device may determine a network state (e.g., 2G cellular connection, 3G cellular connection, 4G cellular connection, or Wi-Fi wireless connection) and send to the on-line service a message indicating the network state. One or more computing devices of the on-line service system may, in response to the network state and without manual input from the user, modify one or more aspects of one or more web pages of the on-line service website that are accessed by the user. For example, in response to a network state with lower bandwidth (e.g., 2G or 3G), the computing devices may modify a web page by replacing one or more images in the web page with respective lower-resolution copies. For example, in response to a network state with lower bandwidth, the computing device may modify a pre-set uploading speed to a lower speed for a photographs or video uploading tool in a web page.

For yet another example, the mobile computing device may determine a display brightness level for a display of the mobile computing device. The display brightness may be set by the user of the mobile computing device. The display brightness may also be adjusted by the mobile computing device (e.g., based on an ambient light). The mobile computing device may send to the on-line service a first message comprising a display brightness level (e.g., 70%) of the mobile computing device. One or more computing devices of the on-line service system may, in response to the first message and without manual user input from the user, send to another computing device (e.g., a desktop computer, a laptop computer) of the user a second message comprising the display brightness level of the mobile computing device. The second message may be configured to cause the other computing device of the user to adjust its display brightness based on the display brightness level of the mobile computing device. For example, the other computing device may adjust its display brightness to the same display brightness level of the mobile computing device.

As described above, the computing device of the on-line service system may identify a change associated with the user's mobile computing device and, without manual user input from the user, modify one or more aspects of web pages of the on-line service website (that are used by the user to access the on-line service). Furthermore, the modification made to the web pages (i.e., preferences of the web pages for the user, or changes to the preferences of the web pages for the user) may be stored in the on-line service system. For example, one or more computing devices of the on-line service system may store the preferences in response to the change associated to the user's mobile computing device (e.g., a new language setting, a new display brightness) in one or more data stores of the on-line service system. In some embodiments, the user may update the preferences (e.g., declining a new setting determined by the on-line service system), and stored the updated preferences in the data stores of the on-line service system For example, the user may update the preferences by accessing a form in a web page provided by the on-line service system.

In particular embodiments, the computing devices of the on-line service system may identify an action by the user on the web pages. The computing devices of the on-line service system may, in response to identifying the action and without manual user input from the user, sending a message to the user's mobile computing device. The message may be configured to cause one or more changes to the mobile computing device that are associated with the action. For example, the computing devices may translate content of a web page to a new language (e.g., French) from a pre-set language (e.g., English) based on a new location (e.g., Paris) of the user's mobile computing device as described earlier. As the user accesses the web page, the user may revert the language setting of the web page to the pre-set language (e.g., by selecting an "Display this page in English" icon displayed in the web page). The computing devices of the on-line service system may modify the web page to the pre-set language (e.g., English). Meanwhile, the computing devices may, based on the user's action (i.e., displaying the web page in the pre-set language) and without manual user input from the user, send a message to the user's mobile computing device. The message may be configured to cause the mobile computing device to stop sending an instruction to the on-line service system for updating language preference to the new language (e.g., French), while the mobile computing device is near or at the new location (e.g., Paris).

Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

Figure 3:
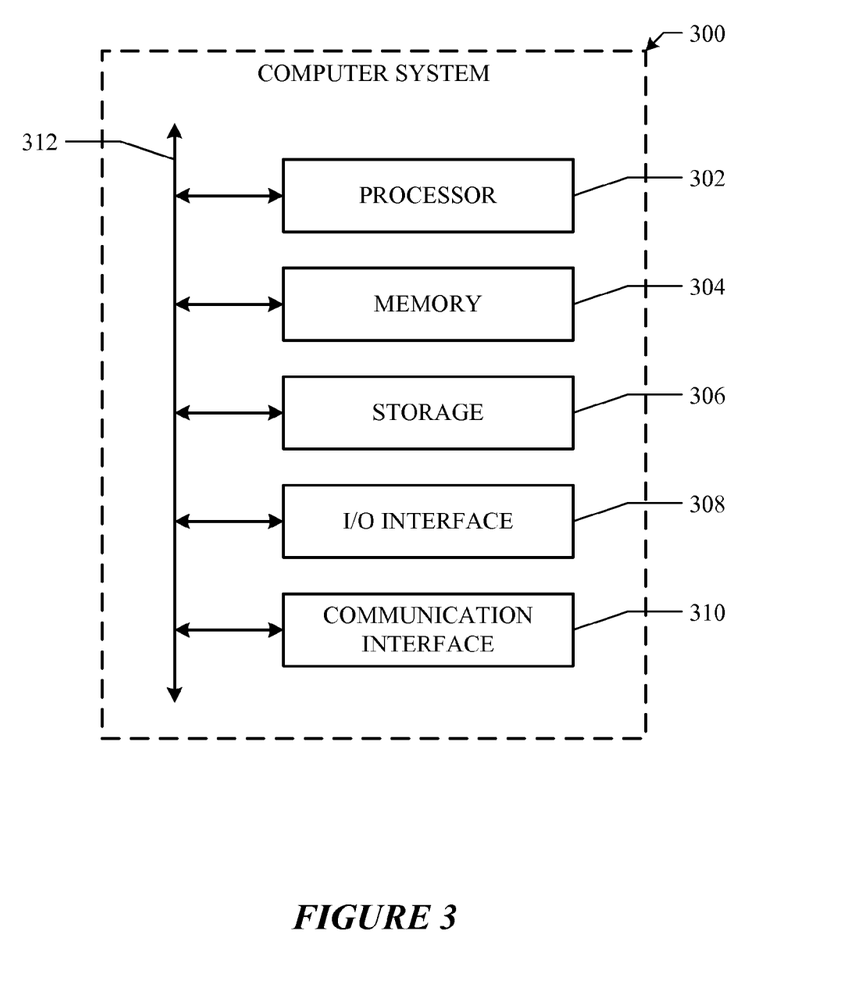
FIG. 3 illustrates an example computer system.

FIG. 3 illustrates an example computer system 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
by one or more computing devices of a social-networking system providing an on-line service, identifying a change associated with a mobile computing device of a user of the on-line service, the on-line service being accessible to the user at least through a website hosted by the system, and the website having one or more web pages associated with use of the on-line service by the user, wherein the change comprises a change in location from a previous location to a new location of the mobile computing device,
wherein identifying the change comprises identifying a change in a language of the mobile computing device based on the change in the location by determining that the new location is associated with a new language that is different from a pre-set language of the mobile computing device;
by the computing devices, in response to identifying the change in the language of the mobile computing device and without manual user input from the user, modifying one or more aspects of one or more web pages of the website that are associated with the use of the on-line service by the user, wherein the modifying comprises:
translating content of one or more of the web pages to the new language associated with the new location of the mobile computing device;
updating location information of the user on one or more of the web pages based on the new location of the mobile computing device; and
providing content on one or more of the web pages that is relevant to the new location of the mobile computing device, wherein providing content on one or more of the web pages that is relevant to the new location of the mobile computing device comprises providing on one or more of the web pages a dictionary or translator for the new language associated with the new location of the mobile computing device.

2. The method of claim 1, wherein the change associated with the mobile computing device comprises use by the user of a new language different from the pre-set language on the mobile computing device,
identifying the change further comprises identifying the use by the user of the new language different from the pre-set language on the mobile computing device, and
wherein modifying the one or more aspects of the one or more web pages further comprises translating content of one or more of the web pages to the new language different from the pre-set language on the mobile computing device.

3. The method of claim 1,
wherein the content on the one or more of the web pages comprises one or more images of a landmark located at the new location, a selectable icon for a map of public transportation, an advertisement of a store, or a combination thereof.

4. The method of claim 1, wherein the location change of the mobile computing device is identified when a received location is more than a threshold distance from a previously recorded location of the mobile computing device.

5. The method of claim 1, wherein the location change of the mobile computing device is identified when the on-line service system receives from the mobile computing device an indication of the new location, the indication comprising the user checking in to the new location.

6. The method of claim 1, further comprising:
by the computing devices, identifying an action by the user on one or more of the web pages; and
by the computing devices, in response to identifying the action and without manual user input from the user, sending a message to the mobile computing device that is configured to cause one or more changes to the mobile computing device that are associated with the action.

7. The method of claim 6, wherein identifying an action by the user comprises receiving a request to revert a language setting of the one or more web pages to the pre-set language, the method further comprising:
by the computing devices, modifying the one or more web pages to the pre-set language,
wherein the message is configured to cause the mobile computing device to stop sending an instruction to the on-line service system for updating language preference to the new language while the mobile computing device is at the new location.

8. One or more computer-readable non-transitory storage media embodying software that is operable when executed by one or more computing devices of a social-networking system providing an on-line service to:
identify a change associated with a mobile computing device of a user of the on-line service, the on-line service being accessible to the user at least through a website hosted by the system, and the website having one or more web pages associated with use of the on-line service by the user, wherein the change comprises a change in location from a previous location to a new location of the mobile computing device,
wherein identifying the change comprises identifying a change in a language of the mobile computing device based on the change in the location by determining that the new location is associated with a new language that is different from a pre-set language of the mobile computing device;
in response to identifying the change in the language of the mobile computing device and without manual user input from the user, modify one or more aspects of one or more web pages of the website that are associated with the use of the on-line service by the user, wherein the modifying comprises:
translating content of one or more of the web pages to the new language associated with the new location of the mobile computing device;
updating location information of the user on one or more of the web pages based on the new location of the mobile computing device; and
providing content on one or more of the web pages that is relevant to the new location of the mobile computing device, wherein providing content on one or more of the web pages that is relevant to the new location of the mobile computing device comprises providing on one or more of the web pages a dictionary or translator for the new language associated with the new location of the mobile computing device.

9. The media of claim 8, wherein the change associated with the mobile computing device comprises use by the user of a new language different from the pre-set language on the mobile computing device,
   identifying the change further comprises identifying the use by the user of the new language different from the pre-set language on the mobile computing device, and
   wherein modifying the one or more aspects of the one or more web pages further comprises translating content of one or more of the web pages to the new language different from the pre-set language on the mobile computing device.

10. The media of claim 8, wherein the content on the one or more of the web pages comprises one or more images of a landmark located at the new location, a selectable icon for a map of public transportation, an advertisement of a store, or a combination thereof.

11. The media of claim 8, wherein the location change of the mobile computing device is identified when a received location is more than a threshold distance from a previously recorded location of the mobile computing device.

12. The media of claim 8, wherein the location change of the mobile computing device is identified when the on-line service system receives from the mobile computing device an indication of the new location, the indication comprising the user checking in to the new location.

13. The media of claim 8, wherein the software is further operable when executed by one or more computing devices of the system to:
   identify an action by the user on one or more of the web pages; and
   in response to identifying the action and without manual user input from the user, send a message to the mobile computing device that is configured to cause one or more changes to the mobile computing device that are associated with the action.

14. The media of claim 13, wherein identifying an action by the user comprises receiving a request to revert a language setting of the one or more web pages to the pre-set language, the method further comprising:
   by the computing devices, modifying the one or more web pages to the pre-set language,
   wherein the message is configured to cause the mobile computing device to stop sending an instruction to the on-line service system for updating language preference to the new language while the mobile computing device is at the new location.

15. A computing device comprising, the computing device being of a social-networking system providing an on-line service:
   one or more processors; and
   a memory coupled to the processors comprising instructions executed by the processors, the processors being operable when executing the instructions to:
      identify a change associated with a mobile computing device of a user of the on-line service, the on-line service being accessible to the user at least through a website hosted by the system, and the website having one or more web pages associated with use of the on-line service by the user, wherein the change comprises a change in location from a previous location to a new location of the mobile computing device,
      wherein identifying the change comprises identifying a change in a language of the mobile computing device based on the change in the location by determining that the new location is associated with a new language that is different from a pre-set language of the mobile computing device;
      in response to identifying the change in the language of the mobile computing device and without manual user input from the user, modify one or more aspects of one or more web pages of the website that are associated with the use of the on-line service by the user, wherein the modifying comprises:
         translating content of one or more of the web pages to the new language associated with the new location of the mobile computing device;
         updating location information of the user on one or more of the web pages based on the new location of the mobile computing device; and
         providing content on one or more of the web pages that is relevant to the new location of the mobile computing device, wherein providing content on one or more of the web pages that is relevant to the new location of the mobile computing device comprises providing on one or more of the web pages a dictionary or translator for the new language associated with the new location of the mobile computing device.

16. The computing device of claim 15, wherein the change associated with the mobile computing device comprises use by the user of a new language different from the pre-set language on the mobile computing device,
   identifying the change further comprises identifying the use by the user of the new language different from the pre-set language on the mobile computing device, and
   wherein modifying the one or more aspects of the one or more web pages further comprises translating content of one or more of the web pages to the new language different from the pre-set language on the mobile computing device.

17. The computing device of claim 15, wherein the content on the one or more of the web pages comprises one or more images of a landmark located at the new location, a selectable icon for a map of public transportation, an advertisement of a store, or a combination thereof.

18. The computing device of claim 15, wherein the location change of the mobile computing device is identified when a received location is more than a threshold distance from a previously recorded location of the mobile computing device.

19. The computing device of claim 15, wherein the location change of the mobile computing device is identified when the on-line service system receives from the mobile computing device an indication of the new location, the indication comprising the user checking in to the new location.

20. The computing device of claim 15, wherein the processors are further operable when executing the instructions to:
   identify an action by the user on one or more of the web pages; and
   in response to identifying the action and without manual user input from the user, send a message to the mobile computing device that is configured to cause one or more changes to the mobile computing device that are associated with the action.

* * * * *